United States Patent Office 3,509,196
Patented Apr. 28, 1970

3,509,196
AMINOARYLSILOXANOLATES AND SILOXANOLS
AND THEIR PREPARATION
Edwin P. Plueddemann, Midland, and Charles A. Roth, Saginaw, Mich., assignors to Dow Corning Corporation, Midland, Mich., a corporation of Michigan
No Drawing. Filed Sept. 5, 1967, Ser. No. 665,238
Int. Cl. C07f 7/10
U.S. Cl. 260—448.2                                25 Claims

ABSTRACT OF THE DISCLOSURE

Aminoarylsiloxanolates and aminoarylsiloxanols are disclosed. The siloxanolates are prepared by the reduction of the corresponding nitroarylsiloxanolates under mild, alkaline conditions, while the siloxanols are prepared by neutralizing the aminoarylsiloxanolates with an acid. The novel compounds are useful as water repellents, corrosion inhibitors and coupling agents.

---

This invention relates to aminoarylsiloxanolates and aminoarylsiloxanols and to processes for their preparation.

More specifically, this invention relates to a compound selected from the group consisting of:

(1) aminoarylsiloxanolates having the general formula

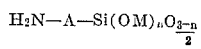

(2) aminoarylsiloxanols having the general formula

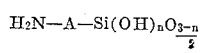

in which formulae A is selected from the group consisting of the phenylene, biphenylene, naphthylene, and alkyl or alkoxy-substituted phenylene, biphenylene and naphthylene radicals, M is an alkali metal, and $n$ has an average value of from about 0.5 to less than 3.

This invention also relates to a process for preparing an aminoarylsiloxanolate which comprises reducing the corresponding nitroarylsiloxanolate under mild, alkaline conditions.

This invention further relates to a process for preparing an aminoarylsiloxanol which comprises reducing a nitroarylsiloxanolate under mild, alkaline conditions to produce the corresponding aminoarylsiloxanolate, and then neutralizing the aminoarylsiloxanolate so produced with an acid to produce the corresponding aminoarylsiloxanol.

In the above formulae, A can be any phenylene, biphenylene, naphthylene, and alkyl or alkoxy-substituted phenylene, biphenylene or naphthylene radical. Thus A can be, for example, a phenylene, biphenylene or naphthylene radical or the corresponding methyl, ethyl, propyl, butyl, methoxy, ethoxy, propoxy or butoxy substituted radicals. Preferably A is a phenylene or a biphenylene radical.

The position of the amino ($NH_2$) group on A is not critical so far as is known at this time. The aminoarylsiloxanolates and siloxanols of this invention can be pure isomers, however, they generally will be mixtures of isomers since such mixtures are more readily prepared and perform as well as the pure isomers for most uses.

In the above formula M can be any alkali metal such as sodium, potassium, lithium, cesium or rubidium. Preferably M is sodium or potassium.

The aminoarylsiloxanolate of this invention can be prepared as follows. First a nitroarylsiloxanolate is prepared by mixing an aqueous solution of an alkali metal hydroxide, or other alkaline material such as sodium acetate, with a nitroarylsilane or a nitroarylsilsesquioxane. The resulting nitroarylsiloxanolate is then reduced either employing catalytic hydrogenation or chemical means. The conditions must be kept mild, and less than one mol of alkali, sodium hydroxide or sodium acetate for example, per mol of silane or silsesquioxane can be used. The temperature should be kept below 100° C., and preferably is kept below 50° C. The aminoarylsiloxanolates prepared in this manner are useful as water repellents and protective coatings, primers, and coupling agents, as well as being starting materials for the preparation of aminoarylsiloxanols.

The process for preparing the aminoarylsiloxanols is identical to that for the preparation of the siloxanolate, supra, except that after the siloxanolate is obtained it is then neutralized with an acid whereupon the aminoarylsiloxanol is produced. The resulting aminoarylsiloxanols are useful in coatings, primers, corrosion inhibitors and as coupling agents. The latter use is of particular interest in the preparation of laminates from high temperature resins.

Another way of carrying out the process of this invention is to reduce a nitroarylsilsesquioxane in a two phase mixture composed of an aqueous alkaline solution and an oxygenated organic solvent of limited water solubility. Thus, for example, a mixture of nitrophenylsilsesquioxane, ethylacetate and an aqueous solution of sodium acetate is readily reduced by hydrogen in the presence of palladium to obtain aminophenylsiloxanol. The aminophenylsiloxanol is found in the upper organic phase and thus may readily be decanted from the aqueous phase which contains dissolved sodium acetate and the suspended hydrogenation catalyst.

Now in order that those skilled in the art may better understand how the present invention can be practiced, the following examples are given by way of illustration and not by way of limitation. All percents referred to are on a weight basis unless otherwise specified.

EXAMPLE 1

25 g. of nitrophenylsilsesquioxane was dissolved in 160 ml. of water containing 7 g. of sodium hydroxide to obtain nitrophenyl sodium siloxanolate. To this solution there was added 0.8 g. of Raney nickel and then 14 g. of hydrazine hydrate was slowly added over a period of ninety minutes. The addition of the hydrazine hydrate resulted in an exothermic reaction with vigorous gas (nitrogen) evolution and a color change from orange to tan. When the reaction was complete the catalyst was filtered off to obtain an aqueous solution of aminophenyl sodium siloxanolate.

The above prepared aqueous solution of aminophenyl sodium siloxanolate was neutralized to litmus by adding 20 ml. of acetic acid whereupon a pink precipitate formed. This precipitate was filtered off to obtain 12.4 g. of aminophenylsiloxanol. Infrared examination of the product showed no absorption for aromatic nitro groups, but did show strong absorption for aromatic amine groups at 2.9, 6.2 and 7.8$\mu$ as well as absorption at 8.5 to 10.0$\mu$ typical of siloxane structures.

The aminophenylsiloxanol, as recovered, was soluble in acetone, ethyl acetate, ethanol, acetic acid, dimethylsulfoxide and other common ketones, esters, alcohols and ethers. After standing a few days at room temperature the product was insoluble in most organic solvents but had a limited solubility in dimethylsulfoxide. The product was insoluble in water but readily soluble in acidic or alkaline aqueous solutions, i.e., in water containing either one mol of acetic acid or one mol of sodium hydroxide per mol of aminophenylsiloxanol.

EXAMPLE 2

A solution of 16 g. of nitrophenylsilsesquioxane in 100 ml. of 1 N sodium hydroxide containing 1 g. of catalyst (5% palladium on carbon) was hydrogenated at three atmospheres of hydrogen pressure. A total of 0.23 mol of hydrogen was taken up over a four hour period at room temperature. After filtering off the catalyst the solution of aminophenyl sodium siloxanolate obtained was neutralized with acetic acid whereupon a pink precipitate formed, 19 g. of the precipitate being recovered by filtration. The product was aminophenylsiloxanol.

A portion of the product was titrated against perchloric acid in acetic acid to obtain an amine equivalent weight of 185–195 as compared to a theoretical value of from about 148.5–171. The major portion of the product was dissolved in 50 ml. of acetone containing 6 g. of acetic acid. This solution was stable to storage for several months and was dilutable with water.

Several attempts to reduce nitrophenylsilsesquioxane as a suspension in water or as a solution in ethyl acetate or ethanol were unsuccessful. Very little hydrogen was absorbed in the presence of the catalyst (5% palladium on carbon) even after 24 hours at three atmospheres of hydrogen pressure.

EXAMPLE 3

A 0.5% solution of the aminophenylsiloxanol of Example 1 in the monoethyl ether of diethyleneglycol was prepared. Style 181 E-glass cloth was dipped into this solution and then dried for 15 minutes at 220° F. A laminate was prepared containing 14 plies of the treated glass cloth (laid up with the warp threads rotated 90° in alternate plies) impregnated with an epoxy resin. The laminate was cured for 30 minutes at 30 p.s.i. and 150° C. to form a molded sheet having a thickness of about 125 mils and containing about 30 percent by weight of the cured resin. The resin employed (Dow Epoxy Resin 331) was a low molecular weight liquid epoxy resin produced by the reaction of Bisphenol-A and epichlorohydrin having a viscosity in the range of 11,000–16,000 cps. and an epoxide equivalent weight in the range of 187–193. The resin contained a stoichiometric amount of metaphenylenediamine curing agent.

A second laminate was prepared as above except that the glass cloth was dipped in a 0.5% solution of the aminophenylsiloxanol of Example 2 prepared by diluting 2 parts of the acetone-acetic acid solution (25% solids) of that example with 98 parts of water.

A third laminate was prepared as above except that untreated glass cloth was employed. This laminate was prepared for purposes of comparison.

The flexural strengths of the above prepared laminates were determined in accordance with U.S. Federal Specification L. P. 406b-Method 1031, and compressive strengths were determined in accordance with Method 1021 of that specification. Flexural strengths were also determined on samples of the laminates which had been boiled in water for two hours and then wiped dry, this test being recognized as roughly the equivalent of standing in water at room temperature for one month. In some instances samples of the laminates were also boiled in water for 48 hours. Results from the latter two tests are referred to herein as the "2 Hr. Boil" and "48 Hr. Boil" data respectively. The following test results were obtained.

| Glass Treatment | Flexural Strength (p.s.i.) | | | Compressive Strength (p.s.i.) | |
|---|---|---|---|---|---|
| | Dry | 2 Hr. Boil | 48 Hr. Boil | Dry | 2 Hr. Boil |
| Product of Ex. 1 | 74,800 | 60,900 | 44,600 | 55,600 | 42,300 |
| Product of Ex. 2 | 82,800 | 71,600 | 56,200 | 54,900 | 48,000 |
| None | 71,300 | 51,700 | | 52,000 | 27,400 |

EXAMPLE 4

To a solution of 12.5 g. of nitrobiphenylylsilsesquioxane in 100 ml. of ethyl acetate there was added 50 ml. of 1 M aqueous sodium hydroxide and 50 ml. of ethanol to obtain nitrobiphenylyl sodium siloxanolate. To this there was added 0.5 g. of catalyst (10% palladium on carbon) and then the solution pressurized to 40 p.s.i. in a Parr hydrogenation bottle. After 16 hours, 13 p.s.i. of hydrogen had been absorbed which is slightly more than the theoretical amount of 12.5 p.s.i. The catalyst was removed by filtration from the solution. The resulting filtrate contained two liquid phases. The organic phase was devolitilized to obtain 10.3 g. of aminobiphenylylsiloxanol as a brown solid. Infrared analysis of the product showed an absence of nitroaryl absorptions at 6.5 and 7.4$\mu$. and the presence of aminoaryl absorptions at 2.9 and 6.2$\mu$. Elemental analysis of the product showed 5.85% nitrogen as compared to a theoretical value of 6.3% nitrogen.

EXAMPLE 5

When the nitroarylsiloxanolates specified below are substituted for the nitrophenyl sodium siloxanolate of Example 1 or 2, the indicated aminoarylsiloxanolate is obtained upon reduction and, upon subsequent neutralization, the indicated aminoarylsiloxanol is obtained.

| Nitroarylsiloxanolate | Aminoarylsiloxanolate | Aminoarylsiloxanol |
|---|---|---|
| (A) Nitronaphthyl sodium siloxanolate | Aminonaphthyl sodium siloxanolate | Aminonaphthylsiloxanol. |
| (B) Nitrophenyl potassium siloxanolate | Aminophenyl potassium siloxanolate | Aminophenylsiloxanol. |
| (C) Nitrobiphenylyl potassium siloxanolate | Aminobiphenylyl potassium siloxanolate | Aminobiphenylylsiloxanol. |
| (D) Nitro(methylphenyl) lithium siloxanolate | Amino(methylphenyl) lithium siloxanolate | Amino(methylphenyl) siloxanol. |
| (E) Nitro(t-butylbiphenylyl) sodium siloxanolate | Amino(t-butylbiphenylyl) sodium siloxanolate | Amino(t-butylbiphenylyl) siloxanol. |
| (F) Nitro(ethoxynaphthyl) sodium siloxanolate | Amino(ethoxynaphthyl) sodium siloxanolate | Amino(ethoxynaphthyl)siloxanol. |
| (G) Nitro(isopropoxyphenyl) sodium siloxanolate | Amino(isopropoxyphenyl) sodium siloxanolate | Amino(isopropoxyphenyl)siloxanol. |

EXAMPLE 6

When hydrochloric, formic, propionic or oxalic acid is substituted for the acetic acid of Example 1, essentially identical results are obtained.

EXAMPLE 7

When the aminophenylsiloxanol of Example 1 or the aminobiphenylylsiloxanol of Example 4 is used as a coupling agent to form laminates from glass cloth using polybenzimidazole or polyimide resins, the resulting laminates have improved flexural and compressive strengths, even at high temperatures as compared to comparable laminates prepared without the coupling agent.

EXAMPLE 8

A heterogeneous liquid mixture was prepared by mixing 100 ml. of water containing 2.3 g. of sodium acetate dissolved therein, 68 ml. of an ethyl acetate solution of nitrobiphenylylsilsesquioxane containing 25.5 g. of the silsesquioxane, and 32 ml. of ethyl acetate containing 1 g. of catalyst (10% palladium on carbon) dispersed therein. This mixture was hydrogenated at room temperature for four hours, during which time 16 p.s.i. of hydrogen was absorbed. Then 6 g. of sodium acetate dissolved in 20 ml. of water was added and hydrogenation continued until an additional 6 p.s.i. of hydrogen was absorbed. The catalyst was filtered from the slurry and then the organic and aqueous layers separated. The organic layer weighed 94.5 g. and contained 20.8 g. of aminobiphenylylsiloxanol. The infrared spectrum of the product showed the absence of aromatic nitro groups and the presence of aromatic primary amine groups.

That which is claimed is:

1. A compound selected from the group consisting of:

(1) aminoarylsiloxanolates having the general formula $$H_2N-A-Si(OM)_nO_{\frac{3-n}{2}}$$

(2) aminoarylsiloxanols having the general formula $$H_2N-A-Si(OH)_nO_{\frac{3-n}{2}}$$

in which formulae A is selected from the group consisting of the phenylene, biphenylene, naphthylene, and alkyl or alkoxy-substituted phenylene, biphenylene and naphthylene radicals, M is an alkali metal, and $n$ has an average value of from about 0.5 to less than 3.

2. A compound as defined in claim 1 which is an aminoarylsiloxanolate (1).

3. A compound as defined in claim 2 wherein A is a phenylene radical and M is sodium.

4. A compound as defined in claim 2 wherein A is a phenylene radical and M is potassium.

5. A compound as defined in claim 2 wherein A is a biphenylene radical and M is sodium.

6. A compound as defined in claim 2 wherein A is a biphenylene radical and M is potassium.

7. A compound as defined in claim 1 which is an aminoarylsiloxanol (2).

8. A compound as defined in claim 7 wherein A is a phenylene radical.

9. A compound as defined in claim 7 wherein A is a biphenylene radical.

10. A process for preparing an aminoarylsiloxanolate having the general formula $$H_2N-A-Si(OM)_nO_{\frac{3-n}{2}}$$

wherein A is selected from the group consisting of the phenylene, biphenylene, naphthylene, and alkyl or alkoxy-substituted phenylene, biphenylene and naphtheylene radicals, M is an alkali metal, and $n$ has an average value of from about 0.5 to less than 3, which process comprises reducing the corresponding nitroarylsiloxanolate having the general formula $$O_2N-A-Si(OM)_nO_{\frac{3-n}{2}}$$

wherein A, M and $n$ have the above defined meanings, said reduction being carried out in an aqueous alkaline medium at a temperature below 100° C.

11. The process of claim 10 wherein the nitroarylsiloxanolate is reduced by catalytic hydrogenation.

12. The process of claim 11 wherein aminophenyl sodium siloxanolate is prepared by reducing nitrophenyl sodium siloxanolate.

13. The process of claim 11 wherein aminobiphenylyl sodium siloxanolate is prepared by reducing nitrobiphenylyl sodium siloxanolate.

14. The process of claim 11 wherein aminophenyl potassium siloxanolate is prepared by reducing nitrophenyl potassium siloxanolate.

15. The process of claim 11 wherein aminobiphenylyl potassium siloxanolate is prepared by reducing nitrobiphenylyl potassium siloxanolate.

16. The process of claim 10 wherein the nitroarylsiloxanolate is chemically reduced.

17. The process of claim 16 wherein the nitroarylsiloxanolate is chemically reduced by hydrazine hydrate.

18. A process for preparing an aminosiloxanol having the general formula $$H_2N-A-Si(OH)_nO_{\frac{3-n}{2}}$$

wherein A is selected from the group consisting of the phenylene, biphenylene, naphthalene, and alkyl or alkoxy-substituted phenylene, biphenylene and naphthalene radicals, and $n$ has an average value of from about 0.5 to less than 3, which process comprises reducing a nitroarylsiloxanolate having the general formula $$O_2N-A-Si(OM)_nO_{\frac{3-n}{2}}$$

wherein A and $n$ *have* the above defined meanings and M is an alkali metal, said reduction being carried out in an aqueous alkaline medium at a temperature below 100° C., whereby the corresponding aminoarylsiloxanolate is produced, and then neutralizing the aminoarylsiloxanolate so produced with an acid to produce the corresponding aminoarylsiloxanol.

19. The process of claim 18 wherein the nitroarylsiloxanolate is reduced by catalytic hydrogenation and the resulting aminoarylsiloxanolate is neutralized with acetic acid.

20. The process of claim 19 wherein aminophenylsiloxanol is prepared by reducing nitrophenyl sodium siloxanolate and then neutralizing the resulting aminophenyl sodium siloxanolate.

21. The process of claim 19 wherein aminophenylsiloxanol is prepared by reducing nitrophenyl potassium siloxanolate and then neutralizing the resulting aminophenyl potassium siloxanolate.

22. The process of claim 19 wherein aminobiphenylylsiloxanol is prepared by reducing nitrobiphenylyl sodium siloxanolate and then neutralizing the resulting aminobiphenylyl sodium siloxanolate.

23. The process of claim 19 wherein aminobiphenylylsiloxanol is prepared by reducing nitrobiphenylyl potassium siloxanolate and then neutralizing the resulting aminobiphenylyl potassium siloxanolate.

24. The process of claim 18 wherein the nitroarylsiloxanolate is chemicaly reduced and the resulting aminoarylsiloxanolate is neutralized with acetic acid.

25. The process of claim 24 wherein the nitroarylsiloxanolate is chemically reduced by hydrazine hydrate.

References Cited

UNITED STATES PATENTS

| | | | |
|---|---|---|---|
| 2,732,390 | 1/1956 | Clark | 260—448.2 |
| 2,881,184 | 4/1959 | Pike | 260—448.2 XR |
| 2,949,434 | 8/1960 | Bailey et al. | 260—448.2 XR |
| 2,957,781 | 10/1960 | Bailey et al. | 260—448.2 XR |
| 3,203,969 | 8/1965 | Pines et al. | 260—448.2 |
| 3,248,329 | 4/1966 | Pines et al. | 260—448.2 XR |

OTHER REFERENCES

Eaborn: "Organosilicon Compounds," Academic Press Inc., 1960, page 272.

TOBIAS E. LEVOW, Primary Examiner

P. F. SHAVER, Assistant Examiner

U.S. Cl. X.R.

106—13, 14; 117—124; 200—46.5; 252—389